United States Patent
Persson et al.

(10) Patent No.: US 9,672,162 B2
(45) Date of Patent: Jun. 6, 2017

(54) DATA PROCESSING SYSTEMS

(71) Applicant: ARM Limited, Cambridge (GB)

(72) Inventors: Hakan Persson, Newmarket (GB); Sean Tristram Ellis, Farnham (GB)

(73) Assignee: ARM LIMITED, Cambridge (GB)

( * ) Notice: Subject to any disclaimer, the term of this patent is extended or adjusted under 35 U.S.C. 154(b) by 735 days.

(21) Appl. No.: 13/969,277

(22) Filed: Aug. 16, 2013

(65) Prior Publication Data
US 2015/0052325 A1 Feb. 19, 2015

(51) Int. Cl.
*G06F 12/14* (2006.01)

(52) U.S. Cl.
CPC ...... *G06F 12/1458* (2013.01); *G06F 12/1433* (2013.01)

(58) Field of Classification Search
CPC .......................... G06F 12/1458; G06F 12/1433
See application file for complete search history.

(56) References Cited

U.S. PATENT DOCUMENTS

| | | | | |
|---|---|---|---|---|
| 6,272,533 B1* | 8/2001 | Browne | ................. | G06F 21/82 709/213 |
| 8,332,660 B2* | 12/2012 | Paver | .................. | G06F 12/1491 713/193 |
| 2002/0095601 A1* | 7/2002 | Hind | .................. | H04L 9/3231 726/22 |
| 2003/0005295 A1* | 1/2003 | Girard | .................... | G06F 21/84 713/167 |
| 2003/0074406 A1* | 4/2003 | Noble | ................. | G06F 21/6218 709/205 |
| 2011/0087899 A1* | 4/2011 | Fetik | ..................... | G06F 21/552 713/193 |
| 2014/0237609 A1* | 8/2014 | Sharp | ..................... | G06F 21/53 726/26 |

FOREIGN PATENT DOCUMENTS

WO 2014126597 A1 8/2014

OTHER PUBLICATIONS

Office Action dated Feb. 18, 2015 in GB Patent Application No. GB1414544.5, 5 pages.
Marsh, "How to Implement Windows Vista Content Output Protection," Microsoft WinHEC 2006, Microsoft Corporation.

* cited by examiner

*Primary Examiner* — David X Yi
*Assistant Examiner* — Ramon A Mercado
(74) *Attorney, Agent, or Firm* — Vierra Magen Marcus LLP (57) ABSTRACT

A data processing system includes a host processor and a graphics processing unit operable to process data under the control of an operating system executing on the host processor. The graphics processing unit can be switched between a normal mode of operation in which the it has read and write access to data that is stored in non-protected memory regions 9 but no or write-only access to any protected memory regions 8, and a protected mode of operation in which it has read and write access to data that is stored in protected memory regions 8 but only has read-only access to any non-protected memory regions 9. The data processing system further comprises a mechanism for switching the graphics processing unit from its normal mode of operation to the protected mode of operation, and from its protected mode of operation to the normal mode of operation.

15 Claims, 3 Drawing Sheets

DATA PROCESSING SYSTEMS

BACKGROUND

The technology described herein relates to data processing systems and in particular to a method of and apparatus for the protected processing of protected content by an accelerator, such as a graphics processing unit (GPU) or a video decoder, under the control of a non-trusted (non-secure) operating system (OS).

Many electronic devices, such as mobile phones or tablets, for example, will include both a host processor (CPU) that executes an operating system, such as Android, and one or more accelerators, such as a GPU, that provide hardware support for specific functions. In the case of a mobile phone or tablet, for example, the GPU may be used to generate the user interface that is displayed under the control of the operating system, and to compose the frame that is displayed on the display to the user.

It is becoming increasingly common for content providers to wish to provide (e.g. stream) protected content, such as videos, to electronic devices (and in particular to mobile devices). In order to support this, it is necessary for the electronic devices to be able to ensure the security of the protected content when it is, e.g., being played back to a user via the device.

One way to do this would be to provide a secure operating mode and environment for the electronic device in which the security of the protected content is protected. For example a protected video player on the electronic device could be used to playback protected video content in a secure fashion, with a 2D composition engine being used directly by the protected video player to provide secure full-screen playback of the protected video content.

However, if the operating system user interface is then needed to be displayed (e.g. to provide notification of an incoming call, text message received, email received, etc.), then the display composition would normally need to switch to the GPU that is generating the user interface. However, current secure video solutions on mobile devices, such as mobile phones, can't perform GPU display compositing in combination with secure video playback. This will then normally require the video playback to be suspended, in order to maintain the protection for the protected video content.

The Applicants believe therefore that there remains scope for improved mechanisms for the provision of protected content processing on electronic devices.

BRIEF DESCRIPTION OF THE DRAWINGS

A number of embodiments of the technology described herein will now be described by way of example only and with reference to the accompanying drawings, in which.

Like reference numerals are used for like features throughout the drawings where appropriate.

DETAILED DESCRIPTION

A first embodiment of the technology described herein comprises a data processing system, the data processing system comprising:
a host processor that executes an operating system;
an accelerator operable to process data under the control of the operating system executing on the host processor;
and memory for storing data to be used or processed by or generated by the accelerator, the memory being configurable to have both protected memory regions that are not readable by the operating system when it is operating in a non-secure mode and non-protected memory regions that are readable by the operating system when it is operating in a non-secure mode;
wherein:
the accelerator can be switched between a normal mode of operation in which the accelerator has read and write access to data that is stored in non-protected memory regions but no or write-only access to any protected memory regions, and a protected mode of operation in which the accelerator has read and write access to data that is stored in protected memory regions but only has read-only access to any non-protected memory regions; and
the data processing system further comprises a mechanism for switching the accelerator from its normal mode of operation to the protected mode of operation, and from its protected mode of operation to the normal mode of operation.

A second embodiment of the technology described herein comprises a method of operating a data processing system that comprises:
a host processor that executes an operating system;
an accelerator operable to process data under the control of the operating system executing on the host processor;
and memory for storing data to be used or processed by or generated by the accelerator, the memory being configurable to have both protected memory regions that are not readable by the operating system when it is operating in a non-secure mode and non-protected memory regions that are readable by the operating system when it is operating in a non-secure mode;
wherein:
the accelerator can be switched between a normal mode of operation in which it has read and write access to data that is stored in non-protected memory regions but no or write-only access to any protected memory regions, and a protected mode of operation in which the accelerator has read and write access to data that is stored in protected memory regions but only has read-only access to any non-protected memory regions;
the method comprising:
when it is desired to use the accelerator to perform protected processing of data:
switching the accelerator to its protected mode of operation;
the accelerator, whilst it is operating in its protected mode of operation, reading data from and writing data to protected regions of the memory, and reading data from, but not writing data to, non-protected regions of the memory;

and when the accelerator has completed its protected processing task, switching the accelerator back to its normal mode of operation.

The technology described herein comprises a data processing system in which an accelerator, such as a graphics processing unit, can operate in both a protected and normal mode. The protected mode would be used, for example, when processing protected content.

When in the protected mode, the accelerator has particular memory access restrictions. In particular, it only has read only access to non-secure memory regions. This prevents the accelerator from writing data into a memory area accessible by the operating system in a non-secure fashion when the accelerator is operating in its protected mode. This can then ensure that the accelerator operation will not cause a risk of leakage of protected data to the operating system.

In this way, regardless of the operation the accelerator performs, it cannot transfer information from its protected world to the operating system, thereby removing any reason to restrict the type of operation the accelerator is allowed to perform on protected content, for example.

(It should be noted here that, unlike in more conventional protected or secure operating environments, in the technology described herein the protected mode of operation is arranged such that the protected "world" only has read-only access to the "normal" world, rather than, as would more conventionally be the case, full access to the "normal" world.)

However, as the accelerator still has read access to the non-protected memory, that allows the accelerator to access data from that memory (from the "normal world") that it may need for its protected mode processing (but without the risk of leakage of protected data into the "normal" world). This can allow, for example, the accelerator to still use and process data from the non-protected "world" when operating in its protected processing mode.

This arrangement of the technology described herein can then still allow the operating system to control processing of, e.g., protected data by the accelerator, whilst ensuring that the operating system cannot gain access to the protected data. This could then allow, for example, protected video content to still be played (to keep playing) whilst a graphics processing unit simultaneously displays a user interface notification, e.g. for a received message.

The accelerator may be any suitable accelerator (execution/functional unit) that can, e.g., provide a resource to the host processor (operating system). It could, for example, comprise a graphics processing unit (GPU), an encryption accelerator, a video accelerator, a network (processing) interface, a digital signal processor (DSP), audio hardware, etc. The accelerator can essentially comprise any component that is optimised for a particular task. In an embodiment it comprises a graphics processing unit.

The data to be processed by the accelerator can be any desired and suitable data (e.g. depending on the nature of the accelerator). In an embodiment, it is content data, and in an embodiment protected content (such as DRM (digital rights management) protected data). The data may, e.g., be video content and/or audio content.

The processing to be performed by the accelerator, e.g. GPU, on the (protected) data may be any desired and suitable such processing, such as, in the case of a GPU, effects processing, overlay generation, display frame composition, etc.

The data processing system is in an embodiment in an electronic device, and in an embodiment a portable device, such as a mobile phone, tablet, etc.

The host processor (CPU) should, and in an embodiment does, have (at least) two operating modes, a normal non-secure operating system mode (e.g. Android) and a secure mode where it runs secure (fully trusted) software, such as an ARM TrustZone (or similar) and/or hypervisor software component, outside the non-secure operating system. The secure mode may be used, for example, and as will be discussed further below, to control and configure the memory access rights configuration for the accelerator.

The host processor will not be able to access the protected memory regions when it is operating in its normal, non-secure operating system mode, but it may, and in an embodiment can, access the protected memory regions when it is operating in its secure mode. The host processor can access non-protected memory regions in both its normal, non-secure operating system mode and in its secure mode.

(It should be noted here that unless the context otherwise requires, references herein to a "secure" mode of operation are intended to refer to operation using fully trusted software, references to a "protected" mode of operation are intended to refer to the particular "protected" mode of operation of the accelerator in the manner of the technology described herein, and references to a "normal" mode of operation are intended to refer to the ordinary operating system operation of the host processor.)

The operating system (and the host processor) may have no access to the protected memory regions in its normal, non-secure operating mode. However, in an embodiment, the operating system in its normal mode of operation has write access (but only write access) to the protected memory regions. This is advantageous compared to the operating system having no access to the protected memory regions, because it allows the operating system to directly write data structures required by the accelerator in its protected mode operation into the protected memory that the accelerator will use in its protected mode of operation.

The restricted memory access when the accelerator is operating in its protected mode can be achieved in any desired and suitable manner. As discussed above, the effect of the memory access restrictions should be so as to ensure that protected data is kept outside the operating system when the accelerator is operating in its protected mode.

This is achieved by the accelerator having, when operating in its protected modes, read only access to non-protected memory areas and read/write access to protected memory areas, and having, when operating in its normal mode, read/write access to non-protected memory areas, and write only or no access to protected memory areas.

This then avoids the need, e.g., for safeguards against the operating system trying to execute a malicious accelerator operation in protected mode to discover protected data.

In its normal mode of operation, the accelerator has no read access to protected memory regions (data). It may also have no write access to protected memory regions, but in an embodiment the accelerator is allowed to have write (but only write) access to protected memory regions in its normal operating mode. This will allow, for example, the accelerator to copy data structures required by the accelerator into protected memory when operating in its normal mode.

In an embodiment the memory protection configuration is separate to, and not affected by, any resetting of the accelerator. The memory protection configuration is in an embodiment also robust with respect to power management, e.g. and in an embodiment, either it is not affected by powerdown, or it is implemented such that no operation is allowed until the configuration has been initialized after powerup.

In one embodiment, bus transaction filtering (a bus transaction filtering mechanism) (bus signalling) is used to provide the memory access restrictions. In an embodiment, an additional signal is included in the relevant bus transaction signalling that indicates if the bus transaction relates to a process that is being carried out in the protected mode or in the normal mode. This signalling is in an embodiment then detected by a firewall between the accelerator and the memory, with the firewall then controlling access to the (data in the) memory accordingly.

Thus in one embodiment, the data processing system includes a firewall between the accelerator and the memory that then controls access to the (data in the) memory accordingly.

The firewall can, e.g., be included in the accelerator, or, e.g., otherwise implemented in the SoC (System-on-Chip), for example in a dynamic memory controller.

The firewall is in an embodiment configured in advance to control the memory access in the desired manner, for example, and in an embodiment, by secure (trusted) host software.

In another embodiment, the memory access restrictions are achieved through use of memory access virtualisation (i.e. by using appropriate memory address virtualisation mapping in a memory management unit (MMU)). In an embodiment two-stage MMU based memory protection is used.

In this arrangement, the stage 2 of the MMU for the accelerator is in an embodiment used for the memory access protection. Different stage 2 page tables could be used for the normal and protected mode processing, but in an embodiment, the same MMU stage two page tables are used for both normal mode and protected mode operation, but the interpretation of the page table access permissions is varied depending upon (i.e. depends upon) which mode (normal or protected) the accelerator processing operation is being performed in. Thus, a different interpretation of the stage 2 page table in the MMU for the accelerator is in an embodiment used depending on the accelerator's operating mode (normal/protected). In an embodiment this is such that memory areas readable in normal mode are not writeable in protected mode. In an embodiment, encoding that is unused (and not readable) in normal mode is used to indicate read/write areas in protected mode.

Thus, in an embodiment, the accelerator has a two stage MMU, with the access permissions for the second stage configured to differ between the normal and protected processing mode.

In one embodiment, the same bits are used to signal access permissions for both the accelerator and host processor (CPU), but for the accelerator in protected mode areas encoded as read/write for normal mode are interpreted as read-only, and areas encoded as write only for normal mode are interpreted as read/write. (When the accelerator is operating in its normal mode, the normal (standard) interpretation of the page table permission bits is used for the accelerator.)

In another embodiment, the accelerator has a two stage MMU, with the protected memory areas being encoded by a separate bit in the page table entries. Again, the access permissions for the second MMU stage in an embodiment differ between normal and protected processing mode, in an embodiment as follows. In protected mode, areas marked as protected have read/write access (or alternatively read access added, or just no change to access permissions), and areas marked as non-protected have write access removed, or are set to read-only. In normal mode, areas marked as protected have read access removed, or no access, or are set to write only access, and areas marked as non-protected are interpreted as usual.

In these arrangements, the MMU stage 2 is in an embodiment managed by trusted host software, such as a hypervisor, or trusted firmware, such as a trusted microcontroller. It is not necessary to implement a full hypervisor for this, so long as the necessary services are provided.

Thus, in an embodiment, the accelerator uses the application MMU stage 1 translation tables (maintained by the operating system), and the operating system MMU stage 2 translation tables (maintained by trusted host software), and protected memory areas are in an embodiment mapped in as normal mode write only pages in the accelerator MMU stage 2.

Then, when operating in the protected mode pages mapped as read/write in normal mode in the MMU stage 2 page tables are interpreted as read only access), and pages mapped as write only in normal mode are interpreted as read/write access.

The switching of the accelerator between its normal and protected modes of operation and vice-versa, can be performed in any desired and suitable manner.

The granularity of the protected/normal mode switching can be either be for the accelerator as a whole (this will be suitable where bus-transaction memory protection is used memory protection), or per address space (MMU configuration context) (this will be suitable where virtualization (MMU) based memory protection is used).

Thus, in one embodiment, the accelerator as a whole is switched between the normal mode and the protected mode of operation (i.e. the accelerator is at any one time either only doing normal processing or only protected processing). This can avoid the need for a complex implementation of security internally in the accelerator.

In another embodiment, the switching between the normal mode and the protected mode is done on an address space (MMU configuration context) basis (e.g. per application) (i.e. such that the accelerator may concurrently perform both protected and normal processing (tasks)). In this case, the mode switching is in an embodiment performed using trusted firmware (as will be discussed below).

The switching process should, and in an embodiment does, ensure that there is no state (e.g. data, etc.) in the accelerator from the protected mode of operation that remains once the accelerator has been switched back to its normal mode of operation. This helps to ensure that there can be no leakage of data from the protected world to the normal world. Thus, in an embodiment, the process of switching the accelerator from its protected mode of operation to its normal mode of operation comprises clearing (and triggers the clearing of) any stored data (e.g. any caches, registers, etc., that store data) from the protected operation.

(The switch from normal to protected mode does not require clearing the internal state of the accelerator.)

The switching may be carried out in any desired and suitable manner, but in an embodiment is carried out by one (or more) of: using trusted firmware to control the switching; using open firmware in conjunction with trusted host software for the switching; fully through trusted software; or using a hardware implemented mechanism (this will be possible where, for example, the accelerator has a hardware internal state clearing mechanism that could be triggered when switching from the protected mode to the normal mode of operation).

If the switching involves trusted host software this can be comprised of any suitable form of trusted host software, such as a trusted virtual machine/hypervisor, ARM TrustZone (or similar), etc.

Where trusted firmware is used to control the switching, then in an embodiment a (trusted) microcontroller (MCU) is used to schedule the transitions between normal and protected mode processing. This may be implemented as part of the accelerator (sub)system.

An advantage of using trusted firmware to control the switching is that the operating system can simply schedule a protected processing command, and the firmware (e.g. MCU) can then schedule the mode switch to protected mode, execute the protected processing and finally switch back to normal mode without the need for further interaction with the host CPU.

In these arrangements, if virtualization (MMU) based memory access protection is being used, then the mode switch can be, and in an embodiment is, applied to a single address space. For example in the case of graphics processing, an unprotected vertex or compute job could run in parallel with a protected fragment job as long as they use different address spaces.

If bus-signalling based memory access protection is used, then the mode switch in an embodiment applies to the whole accelerator, and no unprotected jobs are run in parallel to a protected job.

In the case of bus-transaction based memory access protection the steps taken by the firmware or trusted host software to switch from normal to protected mode in an embodiment comprise one or more of, and in an embodiment all of: ensuring all that unprotected tasks are finished; cleaning and invalidating caches; and configuring the accelerator to issue protected mode transactions on the bus (interconnect).

In the case of bus-transaction based memory access protection the steps taken by the firmware or trusted host software to switch from protected to normal mode in an embodiment comprise one or more of, and in an embodiment all of: ensuring that all protected tasks are finished; cleaning and invalidating caches; and configuring the accelerator to issue normal mode transactions on the bus (interconnect).

In the case of virtualisation (MMU) based memory access protection the steps taken by the firmware or trusted host software to switch from normal to protected mode in an embodiment comprise one or more of, and in an embodiment all of: ensuring that any MMU configuration context for a protected task is not being used by any unprotected task; and reconfiguring the stage 2 MMU context for the protected task into the protected mode.

In the case of virtualisation (MMU) based memory access protection the steps taken by the firmware or trusted host software to switch from protected mode to normal mode in an embodiment comprise one or more of, and in an embodiment all of: ensuring that all protected tasks for the task identifier in question are finished; cleaning the accelerator's caches; and reconfiguring the stage 2 MMU context for normal mode.

In an embodiment the accelerator's caches are flushed if a memory area changes from protected to normal status, to avoid protected data remaining in the accelerator's caches being flushed into the memory area after the host processor has erased it. Correspondingly, in an embodiment a memory area is cleared when it is changed from protected to normal status.

When using this method for protection mode switching, then the trusted firmware (e.g. MCU) in an embodiment controls designation of normal or secure transactions on the bus (interconnect), and the MMU stage 2 configuration, and the operating system in an embodiment has no direct access to the accelerator's registers, except as required to schedule high level commands to the trusted firmware (e.g. MCU).

Using open firmware in conjunction with trusted host software for the accelerator mode switching facilitates implementing protected processing even if the, e.g. MCU, firmware cannot be trusted. This method can also be used even if the (MCU) firmware is trusted, as it reduces the impact if the (MCU) firmware breaks.

In this arrangement, the operating system in an embodiment submits a request for protected processing to the accelerator, but instead of scheduling it directly the firmware (MCU) asks the trusted host software to perform the switch to protected mode. In this case, the accelerator is in an embodiment switched between the normal and protected mode as a whole, regardless of the memory access protection being used.

In these arrangements, the steps taken to switch from normal to protected mode when using bus-transaction based memory access protection in an embodiment comprise one or more of, and in an embodiment all of: the (MCU) firmware ensuring all normal jobs are finished and caches cleaned; the (MCU) firmware requesting protection mode switch from the trusted software; the trusted software blocking the firmware (MCU) and operating system access to the accelerator registers; the trusted software configuring the accelerator to issue protected memory bus transactions; and the trusted software re-enabling firmware (MCU) and operating system access to accelerator registers as required (however, access to the stage 2 MMU configuration registers by the non-secure operating system, and the (untrusted) firmware (MCU) is always blocked).

Correspondingly, the steps taken to switch from protected to normal mode when using bus transaction based memory access protection in an embodiment comprise one or more of, and in an embodiment all of: the firmware (MCU) ensuring that all protected jobs are finished, and caches are cleaned; the firmware (MCU) requesting protection mode switch from the trusted software; the trusted software blocking firmware (MCU) and operating system access to the accelerator registers; the trusted host software checking that the accelerator is idle (i.e. that there are no unfinished protected tasks) (this is necessary because the firmware (MCU) cannot be trusted, and so the trusted host software must double-check that the accelerator has finished its protected processing); the trusted software then invalidating all internal state, including caches, and configuring the accelerator to issue normal bus transactions (to access non-protected memory); and the trusted software re-enabling firmware (MCU) and operating system access to accelerator registers as required (again, access to the stage 2 MMU configuration registers by the non-secure operating system, and the (untrusted) firmware (MCU) is always blocked).

In these arrangements, the steps taken to switch from normal to protected mode when using virtualisation based memory access protection in an embodiment comprise one or more of, and in an embodiment all of: the (MCU) firmware ensuring all normal jobs are finished and caches cleaned; the (MCU) firmware requesting protection mode switch from the trusted software; the trusted software blocking the firmware (MCU) and operating system access to the accelerator registers; the trusted software reconfiguring all stage 2 MMU contexts into protected mode; and the trusted software re-enabling firmware (MCU) and operating system access to accelerator registers as required (however, access to the stage 2 MMU configuration registers by the non-secure operating system, and the (untrusted) firmware (MCU) is always blocked).

Correspondingly, in these arrangements, the steps taken to switch from protected to normal mode when using virtualisation-based memory access protection in an embodiment comprise one or more of, and in an embodiment all of: the firmware (MCU) ensuring that all protected jobs are finished, and caches are cleaned; the firmware (MCU) requesting protection mode switch from the trusted software; the trusted software blocking firmware (MCU) and operating system access to the accelerator registers; the trusted host software checking that the accelerator is idle (i.e. that there are no unfinished protected tasks) (this is necessary because the firmware (MCU) cannot be trusted, and so the trusted host software must double-check that the accelerator has finished its protected processing); the trusted software reconfiguring all stage 2 MMU contexts for normal mode; and the trusted software re-enabling firmware (MCU) and operating system access to accelerator registers as required (again access to the stage 2 MMU configuration registers by the non-secure operating system, and the (untrusted) firmware (MCU) is always blocked).

When using the trusted host software method for protection mode switching, the trusted host software in an embodiment controls the designation of normal or protected transactions on the bus (interconnect) and/or the MMU stage 2 configuration, and the trusted host software can in an embodiment block firmware (MCU) and operating system access to GPU registers during protection mode switching.

In the case of using trusted host software on its own (without firmware (a microcontroller), to perform the switch from normal mode to protected mode (and vice-versa), the operating system in an embodiment submits a request for protected processing directly to the trusted host software, and the accelerator is in an embodiment switched between the normal and protected mode as a whole, regardless of the memory access protection being used. In an embodiment, the operating system does not try to access the accelerator after asking for a mode change until the change is complete. This may help to avoid bus errors.

In these arrangements, the steps taken to switch from normal to protected mode in an embodiment comprise one or more of, and in an embodiment all of: the (non-trusted) operating system ensuring all normal tasks are finished and caches cleaned; the operating system requesting protection mode switch from the trusted host software; the trusted host software blocking operating system access to the accelerator registers; depending on bus-based or virtualization based memory access protection, the trusted software either configuring the accelerator to issue protected bus transactions (to access protected memory), or reconfiguring all stage 2 MMU context identifiers for the task into protected mode; and the trusted software then re-enabling operating system access to the accelerator registers as required (again, access to the stage 2 MMU configuration registers by the non-secure operating system is always blocked).

Correspondingly, the steps taken to switch from protected to normal mode in an embodiment comprise one or more of, and in an embodiment all of: the operating system ensuring that all protected tasks are finished, and caches cleaned; the non-trusted operating system requesting normal mode switch from the trusted software; the trusted software blocking operating system access to accelerator registers; the trusted host software checking that the accelerator is idle (i.e. that there are no unfinished protected tasks) (this is necessary because the operating system cannot be trusted, and so the trusted host software must double-check that the accelerator has finished its protected processing); the trusted software invalidating all internal state, including caches; if bus-based based memory protection is used, configuring the accelerator to issue normal bus transactions (to access non-protected memory), or if virtualization (MMU) based memory access protection is used, reconfiguring all stage 2 MMU configuration context identifiers for normal mode; and the trusted software re-enabling operating system access to registers as required (again, access to the stage 2 MMU configuration registers by the non-secure operating system is always blocked).

When using this method for protection mode switching, the trusted host software in an embodiment controls (and the non-trusted operating system should have no access to) the designation of normal or protected transactions on the bus (interconnect), and/or the MMU stage 2 configuration, and the trusted host software can in an embodiment block the operating system access to accelerator registers during protection mode switching.

In another embodiment, a hardware mechanism is used to control the switching of the accelerator from the normal mode to the protected mode and vice-versa. In this case, there is in an embodiment a hardware mechanism that can be used to set the accelerator in its protected processing mode (and/or in its normal processing mode).

There is in an embodiment then also a hardware mechanism, such as, and in an embodiment, a hardware-implemented reset, that can clear all state inside the accelerator that can be and is used to clear the accelerator state when switching from protected to normal operating mode. In this case the switch from protected to normal mode can be controlled from non-trusted software, open firmware or operating system driver, etc. (the software controlling the switch does not have to be trusted).

Such a hardware mechanism (e.g. that clears internal state in the accelerator when switching from protected to normal mode) can be implemented as desired. For example, a register that can only be set to indicate protected processing mode could be used to indicate protected processing on the bus, and configured such that changing from protected to normal mode then requires the accelerator to be reset. The accelerator could then be, and is in an embodiment, implemented such that when it is reset all internal state is cleared.

If the microcontroller RAM (if present) is not affected by the general accelerator reset, then the microcontroller is in an embodiment configured to not be able to read external memory while the accelerator is operating in protected mode.

Similarly, the memory protection configuration should not be, and in an embodiment is not, affected by the accelerator reset. Thus, for example, where a hardware secured processing mode switch is being used with bus-based or virtualization based memory protection, then the MMU stage 2 configuration should be and is in an embodiment preserved across the accelerator reset.

In an embodiment, the accelerator is signalled as to whether its processing task is to be performed in the protected mode or not. In an embodiment, this is done by the driver for the accelerator providing the indication when it submits the task to the accelerator. The driver, may, e.g., and in an embodiment does, determine whether a task for the accelerator is to be performed in the protected mode or not by tracking whether the memory regions (e.g. buffers) to be used for the task are within the protected "world" (protected memory) or not.

As well as the above operation, the technology described herein may and in an embodiment does also comprise the allocation of protected memory for use by the accelerator for its processing. This may be done as desired, for example as a service by trusted host software, or the operating system could administrate a pool of protected memory that is allocated at system initialisation. For example, the operating system can allocate parts of the protected memory to different purposes, and maintain the MMU stage 1 mappings for that memory. In another arrangement (when using virtualisation-based memory access protection), the operating system could ask trusted host software (for example) to move a particular memory area from the normal (non-protected) world to the protected world or vice-versa.

Similarly, in an embodiment, data for use by the accelerator is copied from a non-protected memory area to a protected memory area. This may again be implemented as desired, e.g., as a service by trusted software, or by allowing the operating system write only access to the protected memory regions.

The protected and non-protected memory regions may be implemented as desired, for example using the existing processes for that of the data processing system in question. (Many mobile platforms, for example, will include infrastructure to separate protected (secure) and non-protected (non-secure) memory areas.)

The accelerator in an embodiment uses both data stored in protected memory regions and data stored in non-protected regions when operating in its protected processing mode.

It will be appreciated from the above, that the technology described herein can allow the operating system to still control the operation of the accelerator when the accelerator is operating in its protected processing mode, as the memory access restrictions and switching mechanism will still protect the protected data from being accessed by the operating system. Thus, in an embodiment, the operation of the accelerator when in its protected processing mode is controlled by the host processor (and in an embodiment by the operating system). This may be done, e.g., and in an embodiment, via a driver for the accelerator that is executing on the host processor. Thus, in an embodiment, the accelerator when operating in its protected mode of operation is still controlled (directly) by a (non-secure) driver on the host system.

Thus, in an embodiment, the operating system controls the processing of the, e.g. protected content, such that the operating system remains fully in control of hardware resources, and the same APIs and drivers can be used for the protected processing as for normal processing. Similarly, in an embodiment, the accelerator executes a program on protected data in its protected processing mode that is provided from non-secure (non-trusted) software (e.g. operating system).

Although a number of different embodiments of the technology described herein have been described above, the Applicants believe that using trusted (MCU) firmware in conjunction with virtualisation (MMU) based memory protection may be particularly advantageous, as that can then allow scheduling of protected processing in parallel with normal processing (and from different virtual machines, if desired), and without the need for any interaction with a hypervisor. Thus, in one embodiment, virtualisation (MMU) based memory protection is used in conjunction with trusted firmware (in an embodiment a trusted microcontroller) as the mechanism for switching the accelerator from its normal mode to its protected processing mode and vice-versa.

The Applicants also believe that using a hardware-based switching mechanism in combination with bus-transaction filtering memory access protection could be particularly advantageous, as that can allow non-trusted firmware/software to schedule protected processing without the need for interaction with secure software. Thus, in another embodiment, bus-transaction-based memory access protection is used in combination with a hardware-based processing mode switching mechanism.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can, and in embodiments do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of a graphics processing unit processing protected video content in a data processing system.

Figure 1:
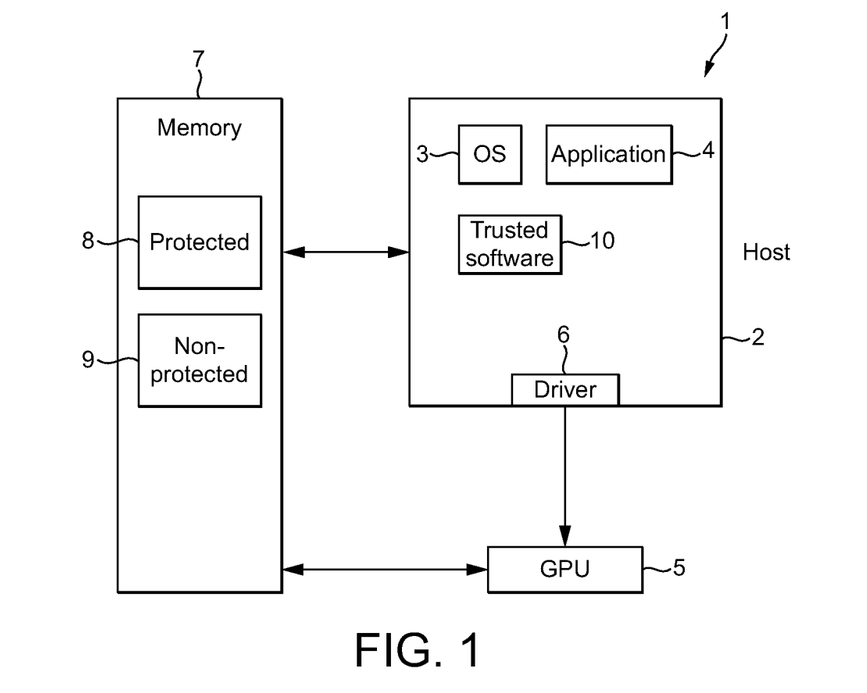
FIG. 1 shows schematically a data processing system that may be operated in the manner of the technology described herein.

FIG. 1 shows an exemplary embedded data processing system 1 for use, for example in a portable electronic device, such as a mobile phone or tablet. The data processing system includes a host processor (CPU) 2 on which an operating system (OS) 3, one or more applications 4, and a trusted software component 10 (e.g. hypervisor, ARM TrustZone or similar) may execute. The host processor 2 has two operating modes, a "normal", non-secure operating system mode (e.g. Android), and a secure mode where it runs other software, such as ARM TrustZone and/or a hypervisor component outside the non-secure operating system.

The data processing system also includes, in this embodiment, a graphics processing unit (GPU) 5, that can perform graphics processing operations for applications and the operating system executing on the host processor. To facilitate this, the host processor also executes a driver 6 for the graphics processing unit.

As shown in FIG. 1, the graphics processing unit 5 and host processor 2 also have access to memory 7 where the data they are processing may be stored. In the present embodiment, the memory can be configured as protected 8 or non-protected 9 memory regions. The protected memory regions 8 are not readable by the host processor (and thus operating system) when it is operating in a non-secure mode of operation. The protected memory regions 8 may be implemented and configured as desired, for example in the normal manner for the data processing system in question.

Figure 2:
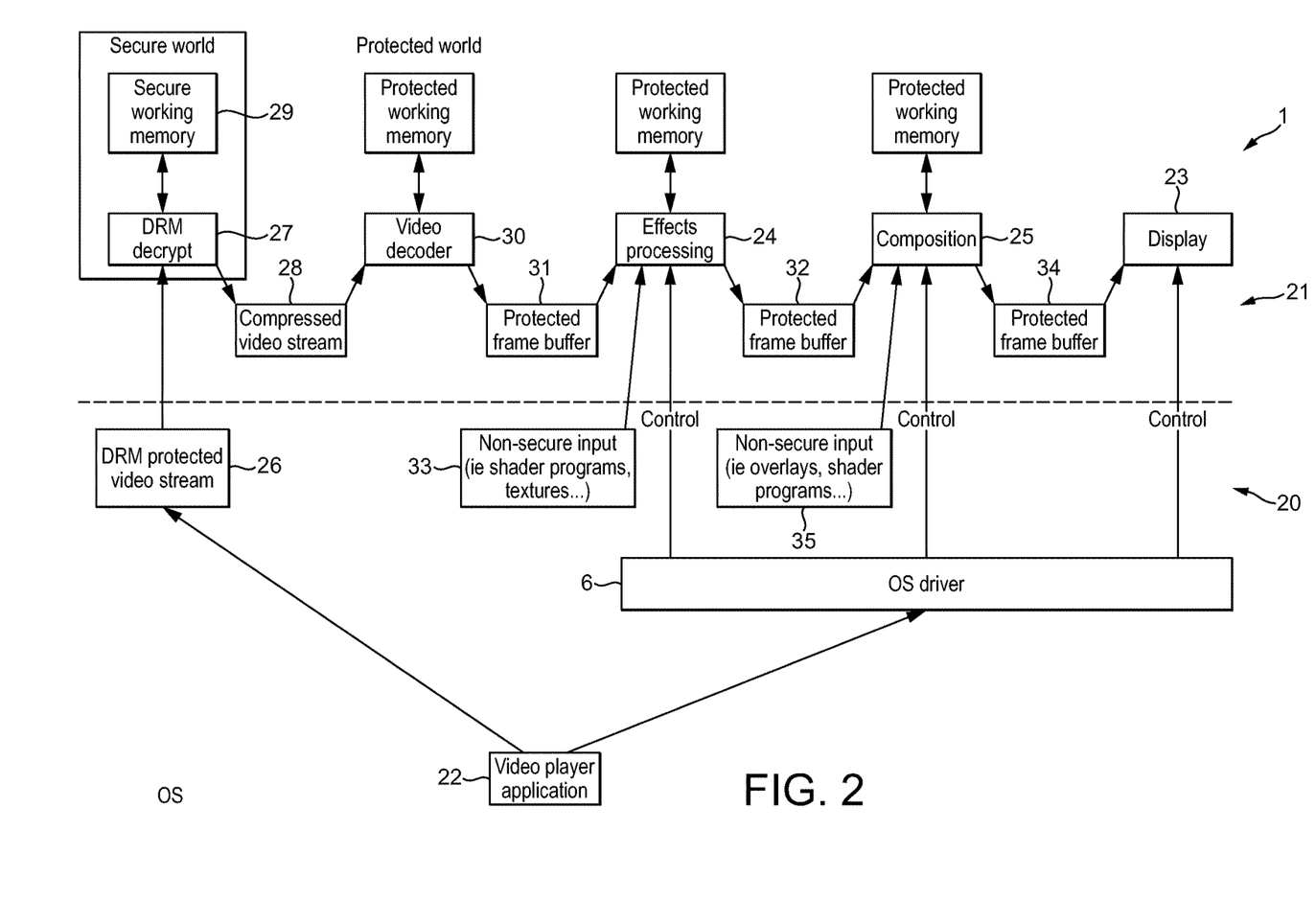
FIG. 2 shows schematically the operation of the data processing system of FIG. 1 in an embodiment of the technology described herein.

FIG. 2 shows schematically the various processing operations and memory access arrangements in the system of FIG. 1 when the graphics processing unit 5 is being used to process protected data (in this case, protected video content).

As shown in FIG. 2, the data processing system 1 is notionally divided into a normal, non-secure (non-trusted) "world" 20 which is under the control of the operating system 3 on the host processor 2. There is then a corresponding "protected world" 21 where protected processing may be carried out by, for example, an encryption unit, a video decoder and the graphics processing unit 5.

In the arrangement shown in FIG. 2, it is assumed that a video player application 22 executing on the host processor is being used to playback a digital rights management (DRM) protected video stream on a display 23 of the electronic device and that as part of this operation the graphics processing unit 5 will be used to provide some effects processing 24 of the video, and some display composition 25 for the video (e.g. to overlay user interface features over the video when it is displayed).

In order to be able to perform this operation in a protected manner (i.e. without the risk of exposing the DRM protected video content to the non-secure, operating system world 20), the graphics processing unit 5 processes the protected video content in a "protected" operating mode.

In order to achieve this, and as will be discussed in more detail below, the graphics processing unit is configured to, when processing the protected video content, operate in a "protected mode" which prevents the leakage of protected data from the graphics processing unit to the "normal" (non-protected) operating system "world" 20.

The first step in this process is to allocate protected memory regions 8 to serve as protected working memory and, e.g., protected frame buffer memory, for the protected video processing operations. This may be done as desired, e.g. as a service of trusted host software executing on the host processor, or the operating system could administrate a pool of protected memory that is allocated at system initialisation. For example, the operating system could allocate parts of the memory to different purposes, and will configure MMU stage 1 mappings for that memory. In the case of using virtualisation-based memory access protection (as will be discussed below), the operating system could, e.g., ask trusted host software to move a particular memory area from the normal, non-protected world to the protected world, or vice-versa.

Then data that will be needed for the protected processing (e.g. data that the GPU will modify as part of its protected processing, such as task descriptors) may be copied into the appropriate protected memory regions from the normal, non-protected world, if required. This is done by configuring the host processor 2 into a secure processing mode (e.g. as a service by trusted host software that can then copy the protected data securely into the protected memory regions), or by allowing the operating system (e.g. the GPU driver) write-only access to the protected memory areas.

The operating system also stores any non-protected data that will be needed by the graphics processing unit into non-secure (non-protected) memory regions. This data may comprise, for example, shader programs, textures, overlays, etc. that are to be used by the graphics processing unit for its processing, but that do not need to be handled in a protected fashion.

Once the necessary data has been stored (both in protected and non-protected memory, as appropriate), the graphics processing can be performed. To do this, the graphics processing unit is first switched into a protected mode of operation (this process will be described in more detail below).

The graphics processing unit is signalled that its processing task is to be performed in the protected mode by the driver for the graphics processing unit indicating that when it submits the task to the graphics processing unit. The driver determines whether a task for the graphics processing unit is to be performed in the protected mode or not by tracking whether the memory regions to be used for the task are within the protected "world" (protected memory) or not.

The video player application will send the encrypted DRM protected video stream 26 that is to be played back to an appropriate secure encryption unit 27 that is operable to decrypt the encrypted video stream to provide a decrypted video bit stream 28. To do this, the encryption unit 27 may, e.g., have access to appropriate encryption keys stored in secured working memory 29, as is known in the art.

The decrypted video bit stream 28 is then provided to a video decoder 30 that is operating in a protected mode and that then produces decoded frames of video data that it stores in a protected frame buffer 31 (i.e. a protected memory region).

The graphics processing unit then, whilst operating in its protected mode, operates to apply effects to the decoded frames of video data (such as applying textures, etc.), and stores the so-processed frames of video data again in a frame buffer in protected memory 32. This operation is performed under the control of the driver on the host processor for the graphics processor, and may use, for example, data such as shader programs, textures, etc., that is stored in unprotected memory 33.

The graphics processing unit then performs an appropriate composition operation 25 in its protected mode on the frames from the protected frame buffer 32 and stores the so-processed frames in a protected frame buffer 34 from where the frames can be provided in a secure fashion to a display 23 for display. Again, this operation may use inputs, such as overlays, shader programs, etc. from non-protected memory 35 and is carried out under the control of the driver for the graphics processor on the host processor.

Once the protected processing task(s) have been completed, the graphics processing unit is switched back to its normal mode of operation.

When processing the protected video content, the graphics processing unit operates in a "protected" mode of operation. In this protected mode of operation, the graphics processing unit is subjected to a number of memory access restrictions, so as to ensure the security of the protected video content.

In particular, when the graphics processing unit is operating in its normal mode, it has no read access to any protected memory regions, but it is allowed to have write access to protected memory regions (this may be useful, as it allows the graphics processing unit to directly copy data structures required by the GPU into protected memory). In its protected operating mode, the graphics processing unit only has read-only access to non-protected memory (i.e. any memory that can be read by the operating system in a non-secure fashion) (this prevents the GPU from writing any protected data into a memory area accessible by the operating system), and read/write access to the protected memory.

A number of embodiments for providing this protected operation will now be described.

Figure 3:
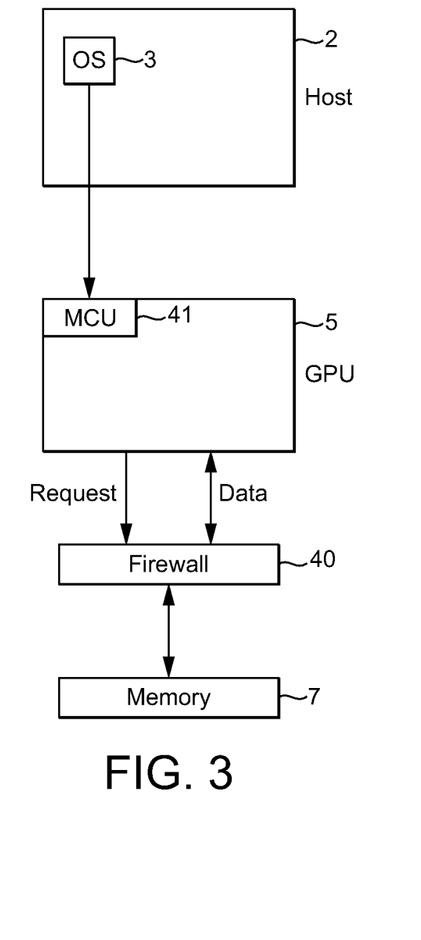
FIG. 3 shows schematically one embodiment for providing the memory access restrictions used in the described embodiments of the technology described herein.

In a first embodiment, a bus transaction filtering mechanism is used to provide the memory access restrictions. In this embodiment, an additional signal is included in the relevant bus transaction signalling (for memory access requests) that indicates if the bus memory access transaction relates to a process that is being carried out in the protected mode or normal mode. This signalling is then detected by a firewall between the graphics processing unit and the memory, which firewall then controls access to the data in memory accordingly. The firewall is configured in advance (in a secure fashion, e.g. by the host processor operating in a secure mode (using trusted software)) to control the memory access in the desired manner.

FIG. 3 illustrates this arrangement. A firewall 40 is arranged between the graphics processing unit 5 and memory 7. When the graphics processing unit sends a memory transaction request, the firewall 40 determines if it relates to a protected processing task or not, and controls the memory access accordingly.

FIG. 3 also shows a microcontroller 41 associated with the GPU 5 that can be used to configure the GPU to generate protected or non-protected bus transactions, and to configure the firewall 40, as appropriate. (This will be discussed in more detail below.)

In this arrangement, the GPU 5 will accordingly generate normal ("non-protected") bus transactions on its master interfaces during normal processing, and "protected" bus transactions during protected mode processing, and the firewall 40 will then use the protected/non-protected transaction indication to apply the correct memory access permissions.

The firewall can be included in the GPU, or implemented in the SoC, for example in the dynamic memory controller. The firewall operates such that for protected processing bus transactions (i.e. for protected processing memory transactions issued by the GPU) write access is only allowed to protected memory, and for normal processing bus transactions (i.e. for non-protected processing transactions issued by the GPU) read access to protected memory is forbidden.

At all times access (read and write) to truly secure memory (such as a secure CPU runtime for managing DRM keys) from the GPU is blocked.

Figure 4:
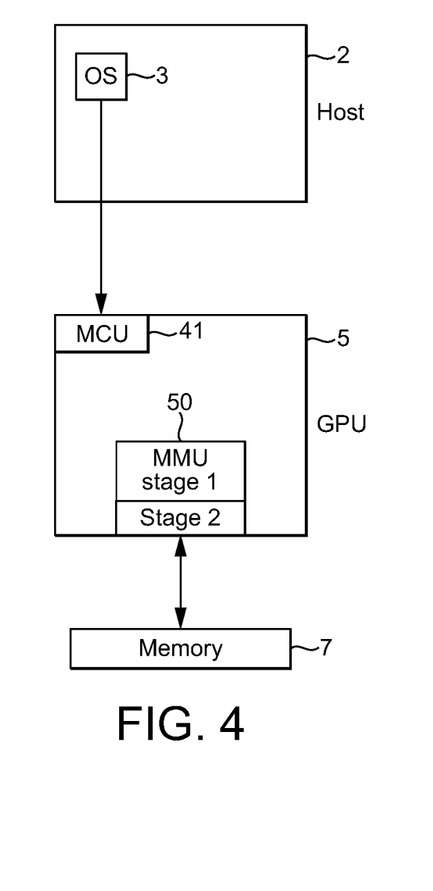
FIG. 4 shows schematically another embodiment for providing the memory access restrictions used in the described embodiments of the technology described herein.

In another embodiment, the memory access restrictions are achieved through use of memory access virtualisation (i.e. by using appropriate memory address virtualisation mapping in a memory management unit (MMU) of the graphics processing unit).

In this case the stage 2 of the GPU MMU is used for the memory access protection. The MMU stage 2 is managed by trusted host software, such as a hypervisor or other trusted host software arrangement (such as ARM TrustZone). (A hypervisor is in an embodiment used when virtualisation (an MMU) is used for memory access protection, whereas another trusted host software arrangement (such as ARM TrustZone) is in an embodiment used when bus-based (firewall-based) memory access protection is used.)

FIG. 4 illustrates this arrangement. The GPU 5 has an associated MMU 50 that is used when accessing the memory 7. FIG. 4 also shows an MCU 41 that can be used to configure the MMU context (page table interpretation) to the desired processing mode. (Again, this will be discussed in more detail below.)

In this embodiment, the GPU will use the application MMU stage 1 translation tables (maintained by the operating system) and the operating system MMU stage 2 translation tables (maintained by trusted host software). The protected memory areas are mapped in as write only pages for the normal processing mode in the GPU MMU stage 2.

In this embodiment, the same MMU stage two page tables are used for both normal mode and protected mode operation, but the interpretation of the page table access permissions is varied depending upon which mode (normal or protected) the GPU is operating in.

In one such arrangement, the same bits are used for access permissions for the GPU and CPU, and in protected mode memory areas encoded as read/write for normal mode are interpreted as read-only, and memory areas encoded as write only for normal mode are interpreted as read/write. When the graphics processing unit is operating in its normal (non-protected) mode, the page table permission bits are interpreted in the standard manner.

In another arrangement, the protected memory areas may be encoded by a separate bit in the page table entries, with the access permissions for the second MMU stage then differing between the normal and protected processing mode as follows.

In protected mode, memory areas marked as protected have read/write access (or alternatively read access added, or just no change to access permissions), and areas marked as non-protected have write access removed, or are set to read only. In normal mode, areas marked as protected have read access removed, or no access, or are set to write only access, and areas marked as non-protected are interpreted as usual.

Other arrangements that still achieve the desired memory access restrictions would be possible, if desired.

The memory protection configuration is separate to, and not affected by any GPU reset, and is robust with respect to power management (either not affected by powerdown, or implemented such that no operation is allowed until the configuration has been initialized after powerup). (This is desirable when non-trusted firmware or host software is used for task scheduling.)

As discussed above, in the present embodiment the graphics processing unit is switched from a normal mode of operation to a protected mode of operation and back again.

The switch from normal to protected mode does not require clearing the internal state of the GPU. However, the switch from protected to normal mode ensures that there is no state (e.g. data, etc.) from the protected mode of operation in the graphics processing unit that remains once the graphics processing unit has been switched back to its normal mode. This helps to ensure that there can be no leakage of data from the protected world to the normal world. Thus, the process of switching the graphics processing unit from its protected mode of operation to its normal mode of operation includes clearing any GPU caches, registers, etc., that store data from the protected operation.

(The GPU caches are also flushed if a memory area changes from protected to normal status, as protected data remaining in the GPU caches could then be flushed into the memory area after the CPU has erased it. Also, if a memory region is changed from being protected to non-protected, it is cleared.)

Four different embodiments of accomplishing the switch from normal to protected and protected to normal operating mode will now be described: using a microcontroller (MCU) with trusted MCU firmware to control the switching; using a microcontroller with open MCU firmware in conjunction with trusted host software for the switching; using trusted host software alone (i.e. without any associated MCU (firmware)) to control the switching; and using automatic switching implemented in hardware.

If the switching involves trusted host software this can be comprised of ARM TrustZone (or similar) software or a trusted virtual machine/hypervisor, for example.

When using a microcontroller (MCU) with trusted MCU firmware to control the switching between normal and protected modes, the system will include a suitable MCU subsystem, and the MCU firmware will be provided in a secure manner.

When using a microcontroller with trusted MCU firmware to control the switching between normal and protected modes, the operating system will schedule a protected processing command, and the MCU will then schedule the mode switch to protected mode, execute the protected processing, and finally switch back to normal mode, without further interaction with the host CPU.

In this arrangement, if virtualization based memory access protection is used then the mode switch can be applied to a single address space (MMU configuration context), for example an unprotected vertex or compute job could run in parallel with a protected fragment job as long as they use different address spaces. If bus-based memory access protection is used then the mode switch applies to the whole GPU, and no unprotected jobs can run in parallel to a protected job.

The steps taken by the MCU to switch from normal to protected mode when using bus-based memory access protection are as follows: ensure all unprotected tasks are finished; clean and invalidate caches; and configure GPU to issue protected transactions on the bus (interconnect).

The steps taken by the MCU to switch from protected to normal mode when using bus-based memory access protection are as follows: ensure all protected tasks are finished; clean and invalidate caches; configure GPU to issue normal (non-protected) transactions on the bus (interconnect).

The steps taken by the MCU to switch from normal to protected mode when using virtualisation-based memory access protection are as follows: ensure MMU configuration context identifier(s) for protected task is not being used by any unprotected task; and reconfigure stage 2 MMU configuration context for the protected task into protected mode.

The steps taken by the MCU to switch from protected to normal mode when using virtualisation-based memory access protection are as follows: ensure all protected tasks for the MMU configuration context identifier(s) in question are finished; clean GPU caches; and reconfigure the stage 2 MMU configuration context for normal mode.

When using virtualization based memory access protection it is not necessary from a security point of view to flush caches to protect the data. However, this is likely to be needed in order to make the resulting frame buffer visible to the display interface.

When using this method for protection mode switching, the MCU controls the designation of normal or protected transactions on the bus (this is not accessible from the operating system), the MCU controls the MMU stage 2 configuration (this is not accessible from operating system), and the MCU firmware and execution is protected from the operating system (the operating system has no direct access to GPU registers, except as required to schedule high level commands to the MCU).

If the MCU firmware cannot be trusted it is still possible to implement protected processing if some other trusted software agent (e.g. host TrustZone or hypervisor software) can coordinate the switch between normal and protected modes. This method can also be used even if the MCU firmware is trusted, as it reduces the impact if the MCU firmware breaks.

In this case, the operating system submits a request for protected processing to the GPU, but instead of scheduling it directly the MCU asks the trusted software agent to switch to protected mode.

In this case, the whole GPU is switched between normal and protected mode, regardless of whether bus-based or virtualization-based memory access protection is being used.

In this arrangement, the steps taken to switch from normal to protected mode are as follows: the MCU firmware ensures all normal tasks are finished and caches cleaned; the MCU requests protection mode switch from trusted software agent; the trusted software agent blocks MCU and operating system access to GPU registers; depending on bus-based or virtualization-based memory access protection, the trusted software agent either configures the GPU to issue protected memory transactions on the bus (to access protected memory), or reconfigures all stage 2 MMU configuration context identifiers into protected mode; and the trusted software agent then re-enables MCU/operating system access to GPU registers as required (but neither the non-secure operating system nor the untrusted MCU are ever granted access to the stage 2 MMU configuration registers).

Correspondingly, the steps taken to switch from protected to normal mode are as follows: the MCU ensures all protected tasks are finished, and caches cleaned; the MCU requests protection mode switch from trusted software agent; the trusted software agent blocks MCU and operating system access to GPU registers; the trusted software agent checks that all protected tasks are finished (as in this arrangement the MCU cannot be trusted, the trusted host software must double-check that the GPU is idle, i.e. all protected tasks have been finished); the trusted software agent invalidates all internal state, including caches; if bus-based memory protection is being used, the trusted software agent configures the GPU to issue non-protected memory transactions on the bus (to access non-protected memory); if virtualization based memory access protection is being used, the trusted software agent reconfigures all stage 2 MMU configuration context identifiers for normal mode; and the trusted software agent re-enables MCU/operating system access to GPU registers as required (again neither the non-secure operating system nor the untrusted MCU are ever granted access to the stage 2 MMU configuration registers)).

When using a microcontroller with open MCU firmware in conjunction with trusted host software for protection mode switching, the trusted host software controls the designation of normal or protected transactions on the bus (interconnect) (this is not accessible from the MCU or operating system), the trusted host software controls the MMU stage 2 configuration (this is not accessible from the MCU or operating system), the trusted host software can block MCU access to GPU registers during protection mode switching (this is not accessible from the MCU or operating system), the trusted host software can block operating system access to GPU registers during protection mode switching (the operating system should not use these registers during normal operation, but may require access to them when downloading the MCU firmware and in other similar situations).

(The MCU firmware can be provided by the operating system.)

In another embodiment, a trusted software agent (e.g. host TrustZone or hypervisor software) is used to coordinate the switch between normal and protected modes (without the use of any microcontroller).

In this case, the operating system submits a request for protected processing directly to the trusted software agent to switch to protected mode. The operating system does not try to access the GPU after asking for a mode change until the change is complete, to avoid causing a bus error.

In this case, the whole GPU is switched between normal and protected mode, regardless of whether bus-based or virtualization-based memory access protection is being used.

In this arrangement, the steps taken to switch from normal to protected mode are as follows: the operating system ensures all normal tasks are finished and caches cleaned; the operating system requests protection mode switch from trusted software agent; the trusted software agent blocks operating system access to GPU registers; depending on bus-based or virtualization-based memory access protection the trusted software agent either configures the GPU to issue protected bus transactions (to access protected memory), or reconfigures all stage 2 MMU configuration context identifiers into protected mode; and the trusted software agent re-enables operating system access to GPU registers as required (again the non-secure operating system is not ever granted access to the stage 2 MMU configuration registers).

Correspondingly, the steps taken to switch from protected to normal mode are as follows: the operating system ensures all protected tasks are finished, and caches cleaned; the operating system requests protection mode switch from trusted software agent; the trusted software agent blocks operating system access to GPU registers; the trusted software agent checks that all protected tasks are finished (as in this arrangement the operating system cannot be trusted, the trusted host software must double-check that the GPU is idle, i.e. all protected tasks have been finished); the trusted software agent invalidates all internal state, including caches if bus-based memory protection is being used, the trusted software agent configures the GPU to issue non-protected bus transactions (to access non-protected memory); if virtualization based memory access protection is being used, the trusted software agent reconfigures all stage 2 MMU configuration context identifiers for normal mode; and the trusted software agent re-enables operating system access to GPU registers as required (again the non-secure operating system is not ever granted access to the stage 2 MMU configuration registers)).

When using trusted host software alone for protection mode switching, the trusted host software controls the designation of normal or protected transactions on the bus (interconnect) (this is not accessible from the operating system), the trusted host software controls the MMU stage 2 configuration (this is not accessible from the operating system), and the trusted host software can block operating system access to GPU registers during protection mode switching.

In another embodiment, a hardware secured processing mode switch arrangement is used, by a hardware mechanism that clears the internal state in GPU when switching from protected to normal mode.

In this case, a register that can only be set to indicate protected mode operation is used to indicate protected processing on the bus. Changing from protected to normal mode then requires the GPU to be reset, and the GPU is implemented such that when it is reset all its internal state is cleared.

In this case, if the mechanism for clearing state in the GPU when switching from protected to normal mode cannot be bypassed, and the memory access restriction mechanism is separate from the GPU (and persistent), then the control of the mode switch does not have to be trusted, such that the switch from protected to normal operating mode could be controlled from non-trusted software (e.g. open MCU firmware or operating system driver).

If the MCU RAM (where present) is not affected by the general GPU reset, then the MCU should be prevented from being able to read external memory while the GPU is in protected mode (as the MCU RAM could otherwise provide a path for leaking protected data).

If a hardware secured processing mode switch is being used, then the memory protection configuration should be preserved across the GPU reset (thus with virtualization based memory protection, the MMU stage 2 configuration should be preserved across the GPU reset).

Although the above embodiments have been described with particular reference to the use of a graphics processor, it will be appreciated that the technology described herein can equally be used for other accelerators (execution units), such as video decoders, etc.

It can be seen from the above that the technology described herein comprises, in its embodiments at least, a mechanism for supporting protected processing on an accelerator such as a GPU under control from a non-trusted operating system. This can then allow, for example, the protection of protected video content during playback while still allowing for message notifications, window/menu effects etc., without disrupting video playback (and without visibility of the video frame-buffer to the video player application).

The technology described herein can also reduce the complexity of protected world software. For example, in the video processing case, the only services required from the secure/protected world may be to: decrypt and decode DRM protected video; allocate protected memory for frame buffers and temporary storage on request from non-trusted world; and copy data from non-trusted world into protected memory buffers.

Equally it can allow any application potentially to use a video decrypt and decompress service, multiple protected videos to be decrypted and decompressed in parallel (performance permitting), and applications to apply arbitrary effects and compositions to protected video content.

In some embodiments, the processing of protected content can be fully controlled from non-trusted software, with the only secure software task being the setup of the memory access restrictions.

This is achieved while still allowing the (non-trusted) operating system to control the processing of the protected content, such that the non-trusted operating system remains fully in control of hardware resources, and the same APIs and drivers can be used for the protected content processing as for normal content.

This is achieved, in embodiments of the technology described herein at least, by restricting the accelerator (e.g. GPU) when processing protected data from writing to memory areas that are accessible by the operating system.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A data processing system, the data processing system comprising:
 a host processor that executes an operating system;
 an accelerator operable to process data under the control of the operating system executing on the host processor;
 and memory for storing data to be used or processed by or generated by the accelerator, the memory being configurable to have both protected memory regions that are not readable by the operating system when it is operating in a non-secure mode and non-protected memory regions that are readable by the operating system when it is operating in a non-secure mode; wherein:
 the accelerator can be switched between a normal mode of operation in which the accelerator has read and write access to data that is stored in non-protected memory regions but write-only access to any protected memory regions, and a protected mode of operation in which the accelerator has read and write access to data that is stored in protected memory regions but only has read-only access to any non-protected memory regions; and
 the data processing system further comprises a mechanism for switching the accelerator from its normal mode of operation to the protected mode of operation, and from its protected mode of operation to the normal mode of operation;
 wherein the accelerator's access to the memory is controlled by using bus transaction filtering or by using memory address virtualisation mapping in a memory management unit (MMU), wherein MMU stage two page tables are used for both normal mode and protected mode operation and wherein the same MMU stage two page tables are used for both normal mode and protected mode operation, but the interpretation of the page table access permissions depends upon the mode an accelerator processing operation is being performed in.

2. The system of claim 1, wherein the accelerator comprises one of: a graphics processing unit, an encryption accelerator, a video accelerator, a network interface, a digital signal processor (DSP), or audio hardware.

3. The system of claim 1, wherein the operating system when operating in a non-secure mode of operation has write access but no read access to protected memory regions.

4. The system of claim 1, wherein the data processing system includes a firewall between the accelerator and the memory that controls access by the accelerator to the memory.

5. The system of claim 1, wherein the mechanism for switching the accelerator from its protected mode of operation to the normal mode of operation clears any stored data from the protected operation when it switches the accelerator from its protected mode of operation to the normal mode of operation.

6. The system of claim 1, wherein the mechanism for switching the accelerator from its normal mode of operation to the protected mode of operation, and from its protected mode of operation to the normal mode of operation comprises one of: using trusted firmware to control the switching; using open firmware in conjunction with trusted host software for the switching; using trusted host software for the switching; or using a hardware implemented switching mechanism.

7. The system of claim 1, wherein the mechanism for switching the accelerator from its normal mode of operation to the protected mode of operation, and from its protected mode of operation to the normal mode of operation, comprises using a microcontroller associated with the accelerator to control the switching.

8. A method of operating a data processing system that comprises:
  a host processor that executes an operating system;
  an accelerator operable to process data under the control of the operating system executing on the host processor;
  and memory for storing data to be used or processed by or generated by the accelerator, the memory being configurable to have both protected memory regions that are not readable by the operating system when it is operating in a non-secure mode and non-protected memory regions that are readable by the operating system when it is operating in a non-secure mode; wherein:
  the accelerator can be switched between a normal mode of operation in which it has read and write access to data that is stored in non-protected memory regions but write-only access to any protected memory regions, and a protected mode of operation in which the accelerator has read and write access to data that is stored in protected memory regions but only has read-only access to any non-protected memory regions;
  the method comprising:
  when it is desired to use the accelerator to perform protected processing of data:
  switching the accelerator to its protected mode of operation;
  the accelerator, whilst it is operating in its protected mode of operation, reading data from and writing data to protected regions of the memory, and reading data from, but not writing data to, non-protected regions of the memory;
  and when the accelerator has completed its protected processing task, switching the accelerator back to its normal mode of operation;
  wherein the method further comprises using bus transaction filtering or using memory address virtualisation mapping in a memory management unit (MMU) to control the accelerator's access to the memory, wherein MMU stage two page tables are used for both normal mode and protected mode operation and wherein the same MMU stage two page tables are used for both normal mode and protected mode operation, but the interpretation of the page table access permissions depends upon the mode an accelerator processing operation is being performed in.

9. The method of claim 8, wherein the accelerator comprises one of: a graphics processing unit, an encryption accelerator, a video accelerator, a network interface, a digital signal processor (DSP), or audio hardware.

10. The method of claim 8, wherein the operating system when operating in a non-secure mode of operation has write access but no read access to protected memory regions.

11. The method of claim 8, comprising using a firewall between the accelerator and the memory to control access by the accelerator to the memory.

12. The method of claim 8, comprising clearing any stored data from the protected operation when switching the accelerator from its protected mode of operation to the normal mode of operation.

13. The method of claim 8, wherein the mechanism for switching the accelerator from its normal mode of operation to the protected mode of operation, and from its protected mode of operation to the normal mode of operation comprises one of: using trusted firmware to control the switching; using open firmware in conjunction with trusted host software for the switching; using trusted host software for the switching; or using a hardware implemented switching mechanism.

14. The method of claim 8, comprising using a microcontroller associated with the accelerator to control the switching of the accelerator from its normal mode of operation to the protected mode of operation, and from its protected mode of operation to the normal mode of operation.

15. A non-transient computer readable storage medium storing computer software code which when executing on a processor performs a method of operating a data processing system that comprises:
  a host processor that executes an operating system;
  an accelerator operable to process data under the control of the operating system executing on the host processor;
  and memory for storing data to be used or processed by or generated by the accelerator, the memory being configurable to have both protected memory regions that are not accessible to the operating system when it is operating in a non-secure mode and non-protected memory regions that are accessible to the operating system when it is operating in a non-secure mode; wherein:
  the accelerator can be switched between a normal mode of operation in which it has read and write access to data that is stored in non-protected memory regions but write-only access to any protected memory regions, and a protected mode of operation in which the accelerator has read and write access to data that is stored in protected memory regions but only has read-only access to any non-protected memory regions;
  the method comprising:
  when it is desired to use the accelerator to perform protected processing of data:
  switching the accelerator to its protected mode of operation;
  the accelerator, whilst it is operating in its protected mode of operation, reading data from and writing data to protected regions of the memory, and reading data from, but not writing data to, non-protected regions of the memory;
  and when the accelerator has completed its protected processing task, switching the accelerator back to its normal mode of operation;
  wherein the method further comprises using bus transaction filtering or using memory address virtualisation mapping in a memory management unit (MMU) to control the accelerator's access to the memory, wherein MMU stage two page tables are used for both normal mode and protected mode operation and wherein the same MMU stage two page tables are used for both normal mode and protected mode operation, but the interpretation of the page table access permissions depends upon the mode an accelerator processing operation is being performed in.

* * * * *